March 12, 1940.  M. BAILEY  2,193,119
APPARATUS FOR TREATING TIRES
Filed Aug. 26, 1937   3 Sheets-Sheet 1

INVENTOR.
MILO BAILEY
BY
ATTORNEYS

March 12, 1940.  M. BAILEY  2,193,119
APPARATUS FOR TREATING TIRES
Filed Aug. 26, 1937  3 Sheets-Sheet 2

INVENTOR.
MILO BAILEY
BY
ATTORNEYS.

March 12, 1940.  M. BAILEY  2,193,119
APPARATUS FOR TREATING TIRES
Filed Aug. 26, 1937   3 Sheets-Sheet 3

INVENTOR.
MILO BAILEY
BY
ATTORNEYS.

Patented Mar. 12, 1940

2,193,119

UNITED STATES PATENT OFFICE 2,193,119

APPARATUS FOR TREATING TIRES

Milo Bailey, Detroit, Mich., assignor, by mesne assignments, to United States Rubber Company, New York, N. Y., a corporation of New Jersey Application August 26, 1937, Serial No. 160,987

13 Claims. (Cl. 18—2)

This invention relates to apparatus for treating pneumatic tires, and in particular it comprehends an apparatus for administering a process of heat treatment to pneumatic tires. It further aims to provide mechanism for manipulating tires in such a way that regions at the base of grooves defining the antiskid configurations are placed under tension while heat is applied thereto, and held under tension until the applied heat has been dissipated by application of a cooling medium.

This apparatus is primarily intended for execution of the process set forth in Patent No. 2,110,224, dated March 8, 1938, for improving the flexing resistance of vulcanized rubber tires.

In general, the invention comprises means for supporting and rotating a tire, means for depressing the tire transaxially, and means for subjecting localized portions of the tire to the application of different temperatures.

Among the objects of the invention is to provide an apparatus capable of efficiently and uniformly manipulating and treating tires for the purpose of increasing the useful life of pneumatic tires.

These and other objects and advantages will appear more fully in the following detailed description which is to be considered in connection with the accompanying drawings, in which.

Figure 1:
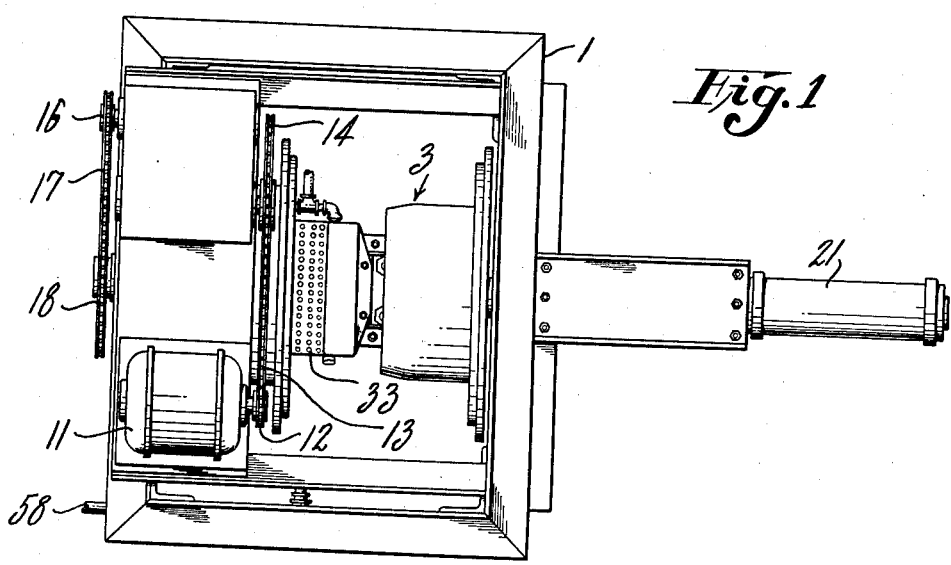
Fig. 1 is a plan view, illustrating an embodiment of the invention for heat treating pneumatic tires.
Figure 2:
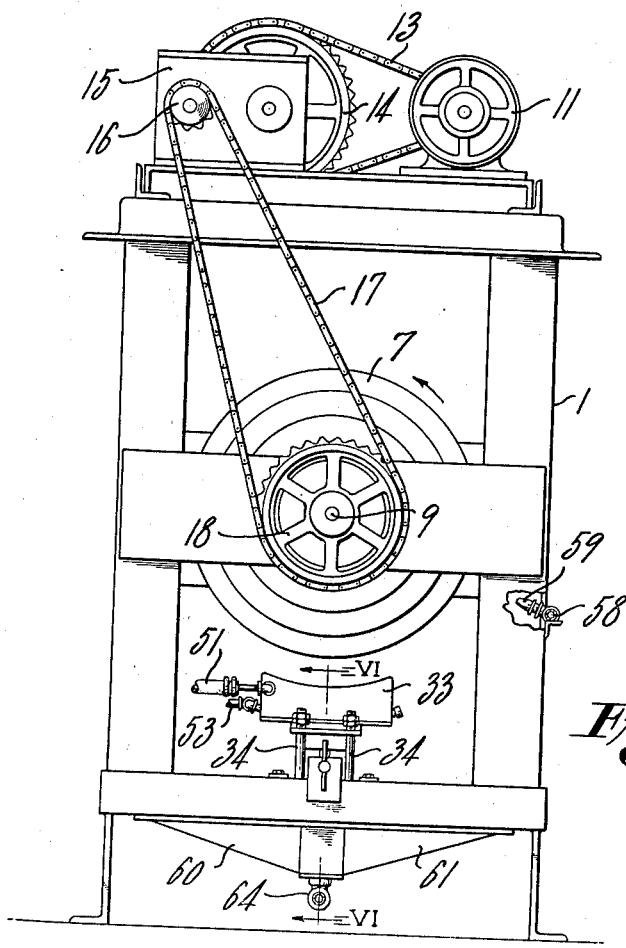
Fig. 2 is an end elevational view thereof, a portion of the housing being broken away to show the cooling nozzle.
Figure 3:
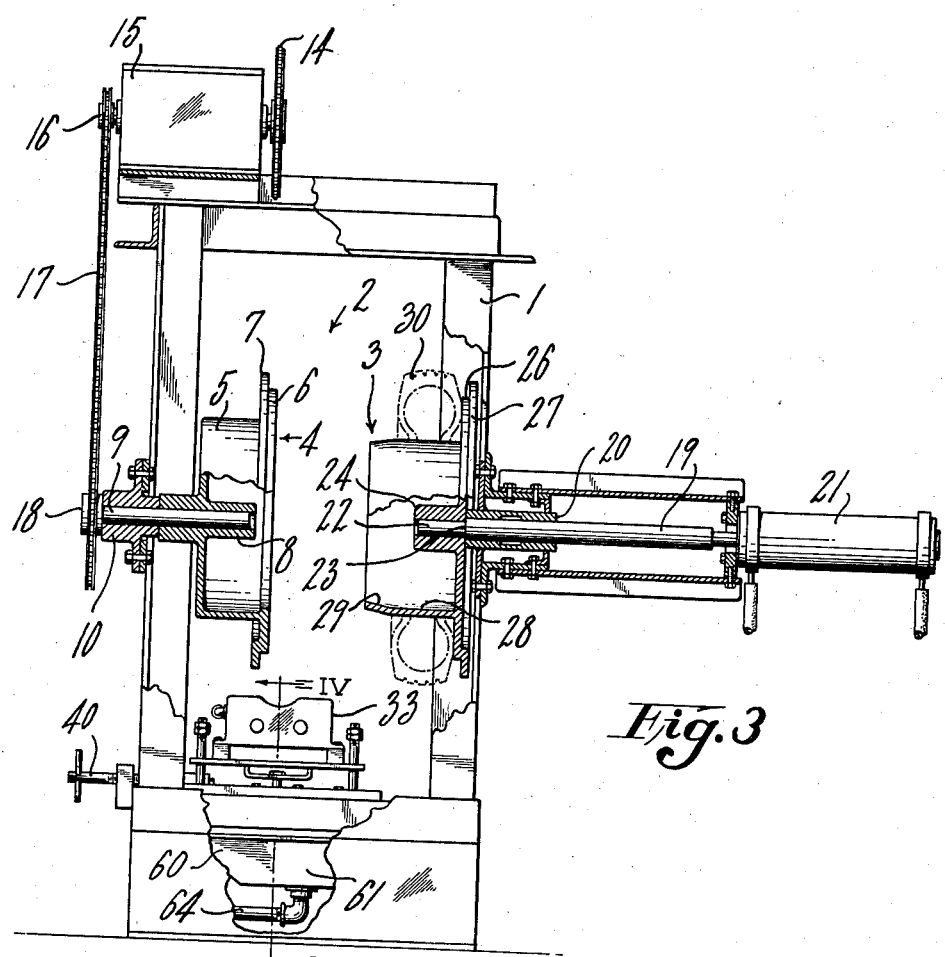
Fig. 3 is a side view of the mechanism shown in Fig. 1, partly in elevation and partly in section.
Figure 5:
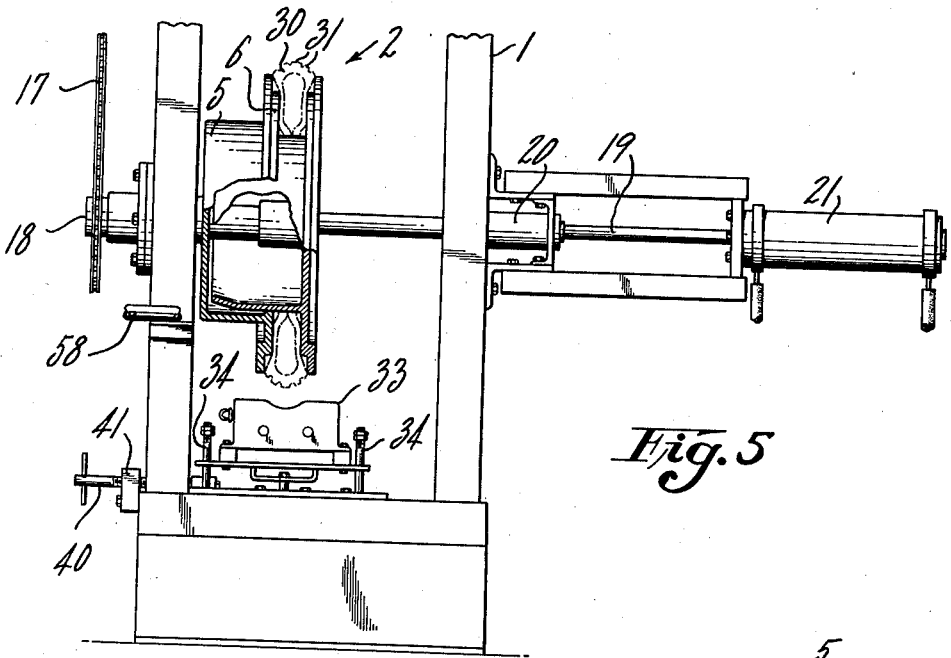
Fig. 5 is a fragmentary side view of mechanism shown in Fig. 3, partly in elevation and partly in section, showing a tire compressed between chuck members.
Figure 7:
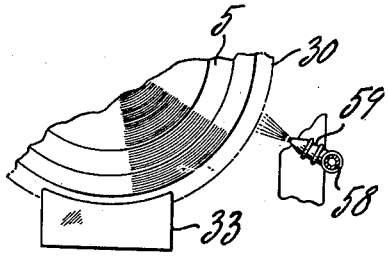

Referring to the drawings, and particularly to Figs. 1, 3, and 5, I show an embodiment of a machine incorporating my invention for heat treating pneumatic tires. The numeral 1 denotes a frame of a machine having mounted therein at a convenient height a chuck 2 (Figs. 3 and 5) comprising a rotatable drum 3 adapted to be rotated through complementary engagement with a driven flanged member 4. The flanged member 4 comprises a cylindrical shell 5 having an annular flange 6 and a receding lip portion 7. The flanged member 4 includes a hub 8 keyed to a shaft 9 journaled in a bearing 10 which is mounted on the frame 1 of the machine. Rotary motion is communicated to the flanged member 4 by means of a motor 11 (Figs. 1 and 2), sprocket 12, chain 13, and sprocket 14, through a gear reduction mechanism 15, sprocket pinion 16, and chain 17 passing over a sprocket 18 keyed to the shaft 9.

The rotatable drum 3 (Fig. 3) is free to rotate on a shaft 19 in axial alignment with shaft 9. The shaft 19 is axially movable through a bearing 20 on the frame 1, through the action of a pneumatic cylinder 21. The shaft 19 has a portion 22 of reduced diameter on which the drum 3 is journaled. A shoulder 23 resists backward thrust of the drum 3 when the drum is pneumatically advanced to the position of operation, as shown in Fig. 5. The drum 3 comprises a hub 24, an annular flange 26, having a lip portion 27, and an annular skirt 28. The skirt 28 terminates in a tapering free extremity 29 for permitting a tire to be easily slipped thereon. When the tire drum 3 is advanced from its normal position or position of rest (Fig. 3) toward the flanged member 4, the skirt 28 telescopes with the shell 5 (Fig. 5).

Figure 6:
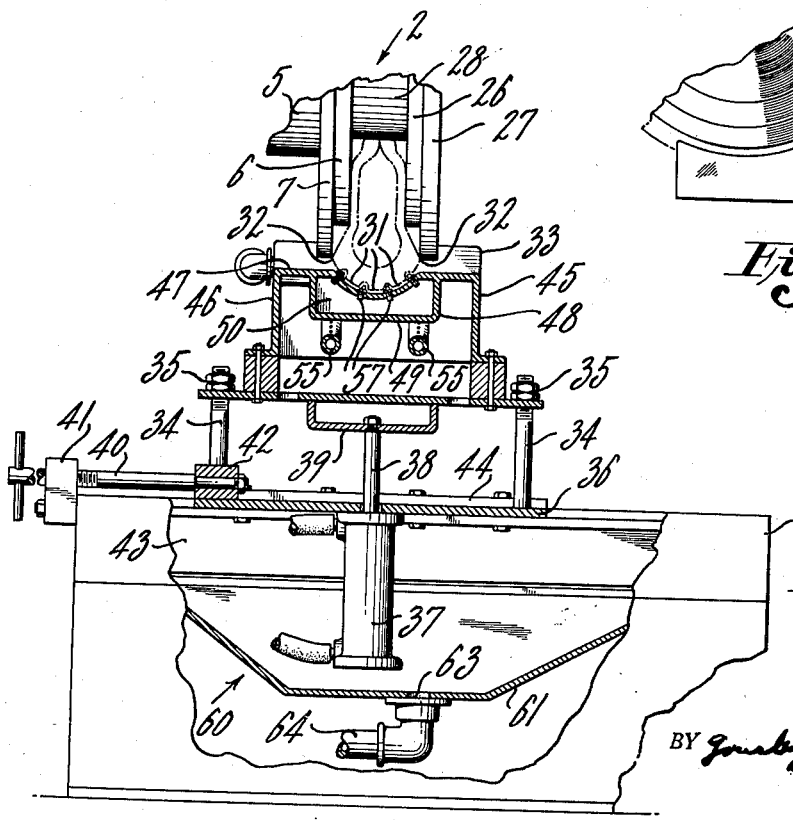
Fig. 6 is an enlarged fragmentary view, partly in section and partly in elevation, showing in detail apparatus for applying heat to a tire; and, Fig. 7 is a fragmentary, detail view of the apparatus for cooling a tire.

When a tire 30 (Fig. 3) is positioned on the skirt 28, movement of the drum 3 into the position shown in Figs. 5 and 6 squeezes the sides of the tire 30 between the flanges 6 and 26, thus spreading apart protruding tread portions or projections 31. This spreading or stretching at the crown of the tire is further accentuated by the lips 7 and 27 which engage the tire at the corners 32 thereof. Axial movement of the rotatable drum 3 toward the shell 5 is limited by contact of the hubs 8 and 24. The tire drum 3 is driven from the drum 4 by frictional engagement with the sides of the tire 30 therebetween (Fig. 5).

Figure 4:
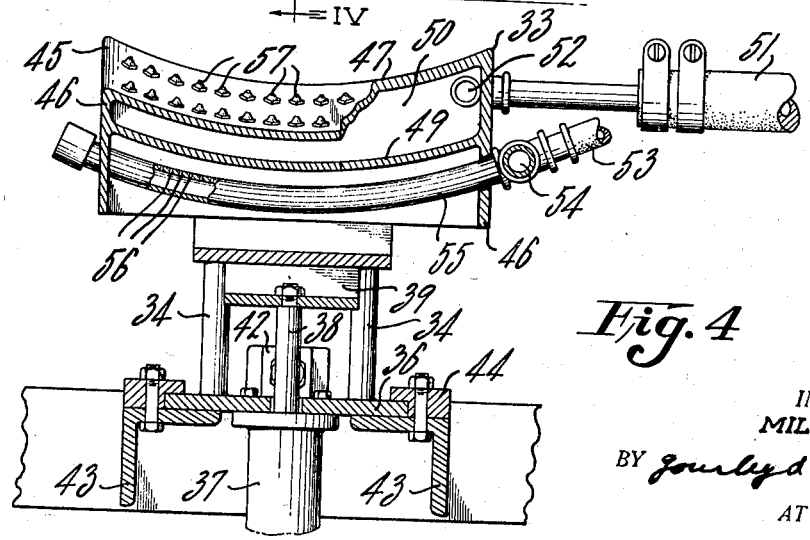
Fig. 4 is an enlarged view taken on line IV—IV of Fig. 3 showing the heat dispensing apparatus in section.

Positioned below the chuck 2 and cooperatively associated therewith is a heating element 33. The heater 33 is adjustable vertically on a plurality of posts 34 (Figs. 4 and 6) within limits of adjustment defined by lock nuts 35, and a base plate 36. A fluid pressure cylinder 37 secured to the base plate 36 imparts vertical movement to the heater 33 through a piston rod 38 and bracket 39. The heater 33 is further adjustable laterally and in a direction substantially parallel with the axis of the chuck 2 by means of a rod 40 in threaded engagement with a thrust block 41 on the frame of the machine 1, and a bearing block 42 mounted on the base plate 36 of the heater. The base 36 is slidably mounted on a pair of angle bars 43, 43, of the frame 1 and retained in engagement therewith by means of L-shaped guide bars 44, 44, secured to the angle bars.

The heating element 33 comprises a casing 45 having vertical side walls 46, and an upper wall 47, the external surface of which generally defines a curvature of radius substantially similar to the radius of a tire to be treated (Fig. 4) and a lateral curvature generally defining the curvature at the crown of a tire positioned for treatment (Fig. 6). The upper surface 47, side walls 46 and 48, and the curved bottom 49 form a steam chest 50. Steam from any convenient source of supply is conveyed by means of the conduit 51 and inlet port 52, to the chamber 50.

I prefer to superheat the steam to a temperature of about 550° Fahrenheit. To do this, gaseous fuel from any convenient source of supply is conveyed by means of the conduit 53 and header 54 to the curved tubes 55 having a series of apertures 56 forming outlets for the combustible gas. The heat of combustion conducted through the wall 49 superheats the steam passing through the chest 50. Egress of steam from the chamber 50 is through a multiplicity of nozzles 57 disposed in rows and positioned in such a way as to direct steam against the base of the grooves of the tread configuration 31.

The relationship of the nozzles 57 and the tread configuration is such that the nozzles lie in close proximity to the bases of the grooves defining the tread configuration. This is desirable in order that the heat be confined as much as possible to the area at the base of the grooves. To accomplish this, it is preferable that the ends of the nozzles 57 extend within the grooves beyond the outer surfaces defining the tread projections 31.

Heat having been administered to the surface of the tire 30, means is also provided for cooling the tire before its removal from the machine. To this end I provide a pipe 58 (Figs. 1, 2, 5, and 7) secured to the frame 1, through which cold water is forced from any convenient source of supply to the nozzle 59, and is directed against the heated surfaces of the tire. Although I prefer to cool the surface of the treated tire with water or other fluid, I do not intend to limit the invention to such mediums, since a cold gas or other medium might also be effectively employed.

As water drains from the tire it is conveyed away from the machine by an appropriate drain 60 (Figs. 2, 3, and 6). The base of the machine is provided with a tray having inclined sides 61 supported below the heating element 33, so that water flowing downwardly is collected and conveyed to a central exhaust port 63 through which it escapes by way of drain pipe 64.

At the start of the operation of the apparatus, and as shown in Fig. 1, the various elements of the mechanism are in their normal positions; that is, the drum 3 is in its receded position and the heater 33 is lowered through the action of the pneumatic cylinder 37. After the operator places a tire 30 upon the drum 3, the pneumatic cylinder 21 is actuated to advance the drum toward the flanged member 4. The complementary association of the drum and flanged member functions as a chuck for holding the tire and for collapsing the sidewalls of the tire. As it is intended that the tire rotate slowly, it is not necessary to stop rotation of the flange member 4 at the end of each cycle of operation.

When the tire is properly positioned between the drum 3 and the flanged member 4, the operator causes the pneumatic cylinder 37 to be actuated, thus raising the heater 33 in proper relation with the tire 30. Thereafter, a valve (not shown) is operated for permitting the emission of steam from the jets 57. At the same time, the cooling spray device 59 may be set into operation.

In practice, I prefer to rotate the tire in counter-clockwise direction (Fig. 2) so that immediately after heat is administered cooling water is sprayed on the surface of the tire. By this manner of treatment the tire is rotated but slightly more than one revolution, or one revolution in addition to the circumferential distance between the heating element and the area of application of cooling medium.

Upon completion of a revolution of the tire the steam is turned off, the heater is lowered, the chuck is opened and the tire removed, and the apparatus is in readiness for a succeeding cycle of operation so that the tire is treated as described in said Patent No. 2,110,224.

While I have shown a preferred embodiment of my invention, it is intended that it shall be susceptible of obvious modifications as indicated by the scope of the appended claims.

Having thus described my invention, what I claim and desire to protect by Letters Patent, is:

1. In an apparatus for treating tires having a tread configuration including grooves, the combination of a pair of supports for engaging bead and side wall portions of a tire and leaving the tread portion thereof free, means on one of the supports for initially mounting the bead portions of the tire, means for moving at least one of the supports toward the other support for imparting tension strains to the regions at the bases of the grooves of the tire tread, and means spaced from the tread portion for quickly and intensively heating the extended area of the tread.

2. In an apparatus for treating tires having a tread configuration including grooves, the combination of a pair of supports for a tire, having an unobstructed space therebetween for the insertion of a tire, means on one of the supports for initially mounting the tire so that the tread portion thereof is free for processing, means for moving at least one of the supports toward the other support for imparting tension strains to the regions at the bases of the grooves of the tire tread, means in close proximity to the free tread portion of the tire for rapidly heating a portion of the extended area of the tread, and simultaneously operable means for cooling an adjacent portion of the extended area of the tread.

3. In an apparatus for treating tires having a tread configuration including grooves, the combination of a flanged support for engaging and centering bead and side wall portions of a tire mounted thereon, a second flange in axial alignment with the flanged support, means for moving one of the flanged members axially of the other flanged member for engaging the tire and flexing the tread portion thereof outwardly for imparting tension strains to the regions at the bases of the grooves of the tire tread, means for rotating one of the flanged members, and means movable relatively to the flanges for heating the extended area of the tread.

4. In an apparatus for treating tires having a tread configuration including grooves, the combination of a pair of supports for a tire, means on one of the supports for initially mounting and centering the tire, means for moving at least one of the supports toward the other support for flexing the tread portion outwardly and imparting tension strains to the regions at the bases of the grooves of the tire tread, and means for heating the extended area of the tread grooves, said heating means comprising a steam chest having a curved surface in substantial conformity to a portion of the tread surface of the tire, and a plurality of nozzles extending from the steam chest and having their outlets in close proximity to the bases of the tire grooves.

5. In an apparatus for treating tires having a tread configuration including grooves, the combination of a pair of supports for a tire, means on one of the supports for initially mounting and centering bead portions of the tire, means for moving at least one of the supports toward the other support for engaging and forcing opposite side wall portions of the tire toward each other thereby outwardly flexing the tire tread and imparting tension strains to the regions at the bases of the grooves of the tire tread, and means for heating the extended area of the tread grooves, said heating means comprising a steam chest having a curved surface in substantial conformity to a portion of the tread surface of the tire, a plurality of nozzles extending from the steam chest and having their outlets in close proximity to the bases of the tire grooves, and means for elevating the steam chest from a retracted position to the position wherein the nozzle outlets are adjacent the tire grooves.

6. In an apparatus for treating tires having a tread configuration including grooves, means for stressing a tire tread and thereby forming extended areas in the tread grooves, means for heating the extended area of the tread, said heating means comprising a steam chest having a curved surface in substantial conformity to a portion of the extended tread surface of the tire, a plurality of nozzles extending from the curved surface of the steam chest and having their outlets in close proximity to the bases of the tire grooves during operation of the nozzles, and means for elevating the steam chest and nozzles from a retracted position to the operative position thereof.

7. In an apparatus for treating tires having a tread configuration including grooves, the combination of a pair of supports for a tire, means on one of the supports for initially mounting the tire in a predetermined location, means for moving at least one of the supports toward the other support for imparting tension strains to the regions at the bases of the grooves of the tire tread while leaving the tread portion thereof free for processing purposes, and means for heating the extended area of the tread, said heating means comprising a steam chest having a curved surface in substantial conformity to a portion of the tread surface of the tire, a plurality of nozzles extending from the curved surface of the steam chest and having their outlets in close proximity to the bases of the tire grooves, means for elevating the steam chest, and additional means for heating the steam chest.

8. In an apparatus for treating tires having a tread configuration including grooves, the combination of a pair of supports for a tire, means on one of the supports for initially mounting the tire, means for moving at least one of the supports toward the other support for flexing the tire tread into a predetermined shape and imparting tension strains to the regions at the bases of the grooves of the tire tread, and means for heating the extended area of the tread grooves, said heating means comprising a steam chest having a curved surface in substantial conformity to a portion of the tread surface of the tire, and a plurality of nozzles extending from the steam chest and having their outlets lying within the grooves formed by the tread configuration and spaced from the tire tread.

9. In an apparatus for treating tires having a tread configuration including grooves, the combination of a flanged support for concentrically positioning a tire thereon, a second flange in spaced axial alignment with the flanged support for the insertion of a tire therebetween, means for moving one of the flanged members axially of the other flanged member for locating the tire in a predetermined transverse plane and imparting tension strains to the regions at the bases of the grooves of the tire tread, means for heating the extended area of the tread, said heating means comprising a steam chest having a curved surface in substantial conformity to a portion of the tread surface of the tire, and a plurality of nozzles extending from the steam chest and having their outlets in close proximity to the bases of the tire grooves.

10. In an apparatus for treating tires having a tread configuration including grooves, the combination of a flanged support for a tire, a second flange in axial alignment with the flanged support, means for moving one of the flanged members axially of the other flanged member for engaging and forcing opposite side wall portions of the tire toward each other thereby outwardly flexing the tread portion thereof and imparting tension strains to the regions at the bases of the grooves of the tire tread, means for rotating one of the flanged members, and means for heating the extended area of the tread, said heating means comprising a steam chest having a plurality of nozzles for each tire groove extending from the steam chest and having their outlets in close proximity to the bases of the tire grooves, and means for varying the location of the steam chest and nozzles relative to the extended grooves.

11. In an apparatus for treating tires having a tread configuration including grooves, the combination of a flanged support for mounting and centering a tire thereon, a second flange in axial alignment with the flanged support, means for moving one of the flanged members axially of the other flanged member for imparting tension strains to the regions at the bases of the grooves of the tire tread and for rendering the tire tread free for treatment, means for rotating one of the flanged members, and means for heating the extended area of the tread, said heating means comprising a steam chest having a curved surface in substantial conformity to a portion of the tread surface of the tire, a plurality of nozzles extending from the curved surface of the steam chest and having their outlets in close proximity to the bases of the tire grooves, and additional means for heating the steam chest.

12. In an apparatus for treating tires having a tread configuration including grooves, the combination of a flanged support for concentrically engaging bead and side wall portions of a tire and leaving the tread portion thereof free, a second flange in axial alignment with the flanged support, means for moving one of the flanged members axially of the other flanged member for imparting tension strains to the regions at the bases of the grooves of the tire tread, means for rotating one of the flanged members, and means for heating the extended area of the tread, said heating means comprising a steam chest having a curved surface in substantial conformity to a portion of the tread surface of the tire, and a plurality of nozzles extending from the steam chest and having their outlets lying within the grooves formed by the tread configuration and arranged in spaced relation relative to the tire tread.

13. In an apparatus for treating tires having a tread configuration including grooves, the combination of a flanged support for concentrically mounting a tire, a second flange in axial alignment with the flanged support, means for moving one of the flanged members axially of the other flanged member for engaging and forcing opposite side wall portions of the tire toward each other thereby outwardly flexing the tread portion of the tire and imparting tension strains to the regions at the bases of the grooves of the tire tread, means for rotating one of the flanged members and the tire, and means for heating the extended area of the tread, said heating means comprising a steam chest having a curved surface in substantial conformity to a portion of the tread surface of the tire, a plurality of nozzles extending from the curved surface of the steam chest and having their outlets in close proximity to the bases of the tire grooves, means for heating the steam chest, and additional means simultaneously operable for cooling the heated extended area of the tread.

MILO BAILEY.